US010453234B2

(12) United States Patent
Baron et al.

(10) Patent No.: US 10,453,234 B2
(45) Date of Patent: Oct. 22, 2019

(54) SYSTEM FOR DISPLAYING AVIONIC DATA ON AT LEAST ONE DISPLAY SPACE, AIRCRAFT COCKPIT INCLUDING SUCH A SYSTEM, RELATED DISPLAY METHOD AND COMPUTER PROGRAM PRODUCT (71) Applicant: THALES, Courbevoie (FR)

(72) Inventors: Luc Baron, Toulouse (FR); Christophe Garnavault, Velizy Villacoublay (FR); Bruno Aymeric, Le Haillan (FR); Yannick Le Roux, Le Haillan (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/652,801

(22) Filed: Jul. 18, 2017

(65) Prior Publication Data
US 2018/0075632 A1 Mar. 15, 2018

(30) Foreign Application Priority Data

Jul. 19, 2016 (FR) ...................................... 16 01112

(51) Int. Cl.
G09G 5/00 (2006.01)
G06F 3/14 (2006.01)
G06F 3/147 (2006.01)
G08G 5/00 (2006.01)
G06T 11/60 (2006.01)
(Continued)

(52) U.S. Cl.
CPC .............. *G06T 11/60* (2013.01); *B64D 43/00* (2013.01); *G01C 23/00* (2013.01); *G06F 3/14* (2013.01); *G06F 3/147* (2013.01); *G09G 5/005* (2013.01); *G09G 5/14* (2013.01); *G08G 5/0021* (2013.01); *G09G 2340/0442* (2013.01);
(Continued)

(58) Field of Classification Search
None
See application file for complete search history.

(56) References Cited

U.S. PATENT DOCUMENTS 8,633,913 B1 * 1/2014 Raghu .................. G08G 5/0021
340/945
9,911,337 B1 * 3/2018 Shapiro ................ G08G 5/0013
(Continued)

FOREIGN PATENT DOCUMENTS

EP 2 253 938 A1 11/2010
FR 2 952 466 A1 5/2011

OTHER PUBLICATIONS

French Search Report for FR 16 01112 dated Apr. 13, 2017.

*Primary Examiner* — Yanna Wu
(74) *Attorney, Agent, or Firm* — Pearne & Gordon LLP (57) ABSTRACT The present invention relates to a system (14) for displaying avionic data on at least one display space of an aircraft cockpit, comprising a processing module (23) configured to receive a message to be displayed indicating an event and to associate the content of this message with one of the display formats, a display module (25) configured to display the received message superimposed on at least one current display format, displayed in a respective display space and an acquisition module (27) configured to acquire a display control command relative to the received message. The display module (25) is further configured to display the display format associated with said message on at least one display space in case of acquisition of the display control command relative to said message.

9 Claims, 4 Drawing Sheets (51) Int. Cl.
 B64D 43/00 (2006.01)
 G09G 5/14 (2006.01)
 G01C 23/00 (2006.01)

(52) U.S. Cl.
 CPC ..... *G09G 2340/12* (2013.01); *G09G 2354/00* (2013.01); *G09G 2380/12* (2013.01)

(56) References Cited

U.S. PATENT DOCUMENTS

2004/0210847 A1* 10/2004 Berson ............... G01D 7/08
 715/788
2013/0176148 A1* 7/2013 Harrison ............ G07C 5/0808
 340/963
2017/0289309 A1* 10/2017 Judd .................. B64D 45/00

* cited by examiner

FIG.5

SYSTEM FOR DISPLAYING AVIONIC DATA ON AT LEAST ONE DISPLAY SPACE, AIRCRAFT COCKPIT INCLUDING SUCH A SYSTEM, RELATED DISPLAY METHOD AND COMPUTER PROGRAM PRODUCT

FIELD OF THE INVENTION

The present invention relates to a system for displaying avionic data on at least one display space.

The present invention also relates to an aircraft cockpit including such a system, a related display method and computer program product.

BACKGROUND OF THE INVENTION

In a known manner, an aircraft cockpit has a large number of piloting and display members allowing an aircraft crew to pilot the aircraft and to monitor the operation of part of the onboard avionic and auxiliary systems.

The growing complexity of these avionic systems as well as the multiple piloting tasks performed by the crew to pilot the aircraft require the presentation of many pieces of information in the cockpit.

This information in particular comprises the current situation of the aircraft relative to the air mass, the orientation and the position of the aircraft relative to a land coordinate system, the desired trajectory of the aircraft, the predictions on the situation of the aircraft at the various waypoints of a flight plan, the flight conditions in the environment of the aircraft and its anticipated flight plan, the technical status of the various onboard avionic systems, etc.

This information is presented in current cockpits in several display spaces, which in particular include the display space referred to as the PFD (Primary Flight Display) or the display space known as the ND (Navigation Display). Other devices typically make it possible to provide status information for the auxiliary systems as well as, in case of failure, the procedures to be carried out by the crew or automatically to address the failures.

One particular type of information displayed in the cockpit relates to messages intended for the crew and generally presented in the form of text, messages received by the display devices from other avionic functions.

These messages in particular comprise failure messages for one or several avionic or auxiliary systems, messages from an air traffic control (ATC) center or messages from an AOC (airline operations center).

The crew is responsible for processing these messages, and must indicate that it has received a message (acknowledgment), read each received message, evaluate its contents, indicate that it will cooperate with the request made by the message or is unable to do so, and carry out one or several requests contained in this message in particular when it involves a message from air traffic control.

Conventionally, the display of such messages is limited to a partial interface leaving each pilot responsible for manually inserting this data into a flight management computer, for example.

One can then see that the processing of these messages systematically requires a cumbersome intervention by the crew regarding workload.

SUMMARY OF THE INVENTION

The present invention aims to propose a display system making it possible to simplify processing of the messages by an aircraft crew.

To that end, the invention relates to a system for displaying avionic data on at least one display space of an aircraft cockpit, the display space being configured to display avionic data using a display format chosen from among a set of predetermined display formats. The display system comprises a processing module configured to receive a message to be displayed indicating an event and to associate the content of this message with one of the display formats; a display module configured to display the received message superimposed on at least one current display format, displayed in a respective display space; and an acquisition module configured to acquire a display control command relative to the received message; the display module further being configured to display the display format associated with said message on at least one display space in case of acquisition of the display control command relative to said message.

According to other advantageous aspects of the invention, the display system comprises one or more of the following features, considered alone or according to all technically possible combinations:

the acquisition module is further configured to acquire a first interaction command related to the displayed received message; and the display module is further configured to indicate the display format associated with the content of the displayed received message as a function of the first acquired interaction command;

the received message is displayed superimposed on the current display format in a predetermined superposition zone of the corresponding display space;

the display control command relative to the received message comprises a movement of the superposition zone of this message toward the center of the corresponding display space;

the display control command relative to the received message comprises a movement over a display space of the superposition zone of this message toward a target zone chosen from among a set of predetermined target zones and associated with one of the display spaces; the display module then being configured to display the display format associated with the message on said display spaces;

the set of display formats consists of: a piloting format dedicated to piloting the aircraft and managing the trajectory of the aircraft in the short term, a preparation format dedicated to preparing an action plan, a tactical format dedicated to carrying out a prepared action plan and a systems format dedicated to the operation of one or several avionic systems; and the acquisition module is further configured to acquire a command to return to the previous display relative to the display format currently displayed following the acquisition of a corresponding display control command; and the display module is further configured to display the display format preceding the current display format in case of acquisition of the return command relative to said current display format.

The invention also relates to an aircraft cockpit including at least one display space and a system for displaying avionic data on the screen, the display system being as defined above.

The invention also relates to a method for displaying avionic data on at least one display space of an aircraft cockpit, the display space being able to display avionic data using a display format chosen from among a set of predetermined display formats.

The display method comprises receiving a message indicating an event and associating this message with one of the display formats; displaying the received message superimposed on at least one current display format, displayed in a respective display space; acquiring a display control command relative to the received message; and displaying the display format associated with said message on at least one display space in case of acquisition of the display control command relative to said message.

The invention also relates to a computer program product including software instructions which, when executed by a processor, carry out a method as defined above.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION OF THE INVENTION

Figure 1:
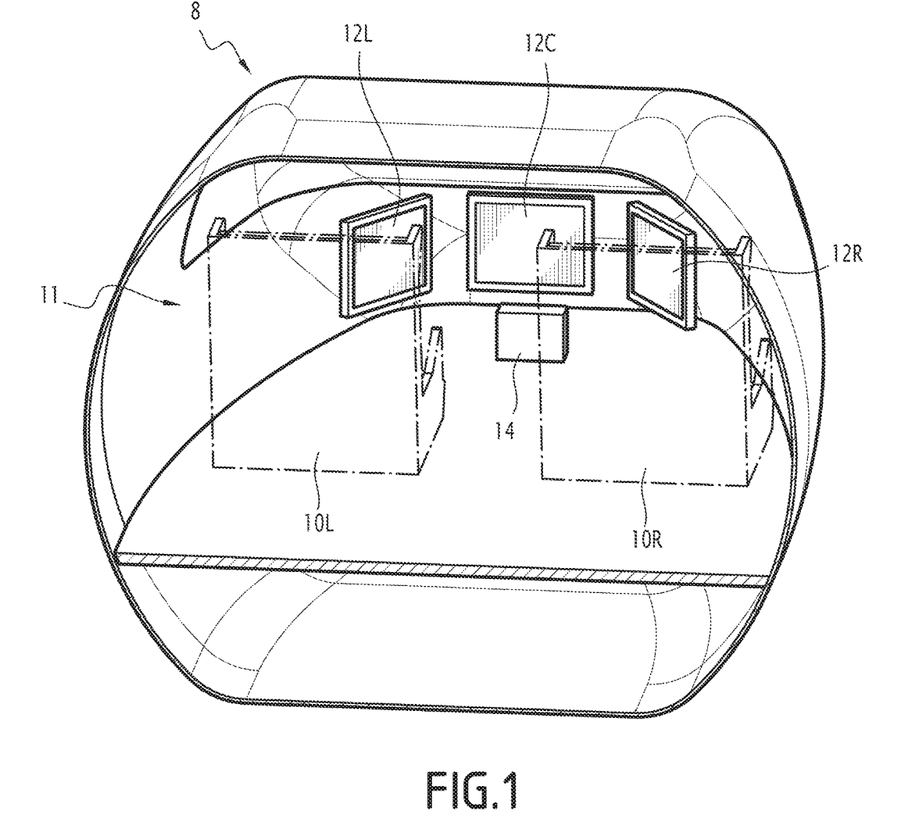
FIG. 1 is a schematic view of an aircraft cockpit according to the invention, the cockpit in particular including a display system according to the invention and a plurality of display screens.

The aircraft cockpit 8 illustrated in FIG. 1 includes a left piloting station 10L, a right piloting station 10R and piloting means 11 associated with these piloting stations 10L, 10R and allowing one or several pilots to pilot the aircraft.

When the aircraft is piloted by several pilots, the term "pilot" used hereinafter refers indifferently to any one of these pilots.

In the example of FIG. 1, the aircraft is an airplane.

More generally, the aircraft is a moving vehicle configured to move in the Earth's atmosphere and including a cockpit, for example a helicopter.

According to another example, the aircraft cockpit 8 is separate from the aircraft and is for example positioned in a stationary or moving manner on the Earth's surface. In this case, the aircraft is for example a drone and the piloting means 11 make it possible to pilot such a drone remotely.

In particular, the piloting means 11 allow the pilot to perform various tasks relative to the aircraft, from the piloting station 10.

These tasks in particular comprise tasks for piloting the aircraft, tasks for monitoring the aircraft and tasks for managing onboard systems in the aircraft.

The piloting tasks comprise a set of tasks performed manually by the pilot to stabilize the aircraft around its center of gravity. These tasks then make it possible to control the attitudes of the aircraft, its energy and its speed vector. The piloting tasks may potentially be delegated by the pilot to an automatic piloting system, which performs them through the flight commands, most often by receiving trajectory setpoints from a flight management system.

The control tasks of the aircraft comprise a set of tasks performed by the pilot to monitor the behavior of the automatic piloting system and the flight management system, and to change the flight plan of the aircraft by optimizing it or in response to air traffic control requests.

The management tasks of onboard systems comprise a set of tasks performed by the pilot to manage the operation of the onboard systems, for example to reconfigure at least some of these onboard systems in order to perform one or several piloting tasks, and to manage any failures thereof.

The piloting means 11 in particular comprise a plurality of display screens 12L, 12C, 12R and a display system 14 according to the invention.

The piloting means 11 further comprise a set of piloting members (not illustrated) known in themselves, for example throttles, control columns, pedals, etc.

In FIG. 1, three screenshots 12L, 12C, 12R are shown. Thus, according to this example embodiment, the display screen 12C is positioned between the two piloting stations 10L, 10R, the display screen 12L is positioned across from the left piloting station 10L and the display screen 12R is positioned across from the right piloting station 10R.

The display screens 12L, 12C, 12R for example have the same dimensions. In particular, each screen 12L, 12C, 12R has a rectangular display surface, for example with a diagonal substantially equal to 15 inches.

According to another example, the piloting means 11 comprise a single display screen. The single display screen for example has a display surface with a surface area substantially equal to the sum of the surface areas of the display surfaces of the screens 12L, 12C, 12R of FIG. 1.

Each display screen 12L, 12C, 12R is in particular a touch-sensitive screen made using techniques known in themselves, for example a capacitive touch-sensitive screen.

Each display screen 12L, 12C, 12R is configured to display information, in particular avionic data, as will be explained later.

Each display screen 12L, 12C, 12R defines an operating state chosen from the group comprising: a normal operating state and a failure operating state.

When a display screen 12L, 12C, 12R is in the normal operating state, its operation is according to the nominal operation for which it was designed.

When a display screen 12L, 12C, 12R is in the failure operating state, it does not allow the pilot to carry out at least one task related to this screen.

The display system 14 is connected to the screens 12L, 12C, 12R and makes it possible to control the display on these screens 12L, 12C, 12R.

Figure 2:
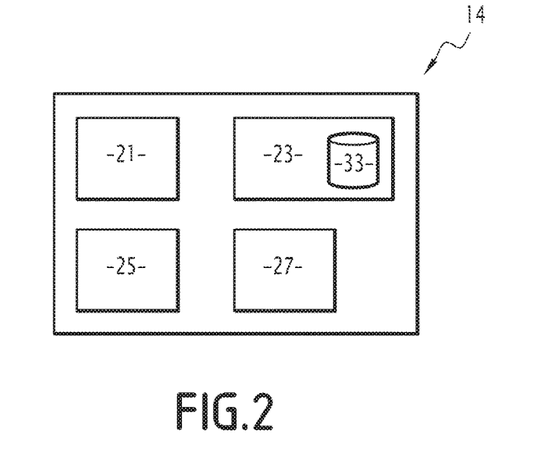
FIG. 2 is a schematic view of the display system of FIG. 1.

In particular, in reference to FIG. 2, the display system 14 includes a management module 21 configured to manage display spaces, a processing module 23 to process information to be displayed, a display module 25 configured to display different display formats, and an acquisition module 27 configured to acquire display control commands.

The display system 14 for example assumes the form of an on board computer further including a processor and a memory configured to store a plurality of software programs that the processor is configured to execute. In this case, each of the modules 21 to 27 assumes the form of one or several software programs stored in the memory and executable by the processor.

At least some of the elements of the display system 14 are redundant to satisfy obligations relative to availability and integrity of the information to be displayed according to the applicable regulations.

Figure 3:
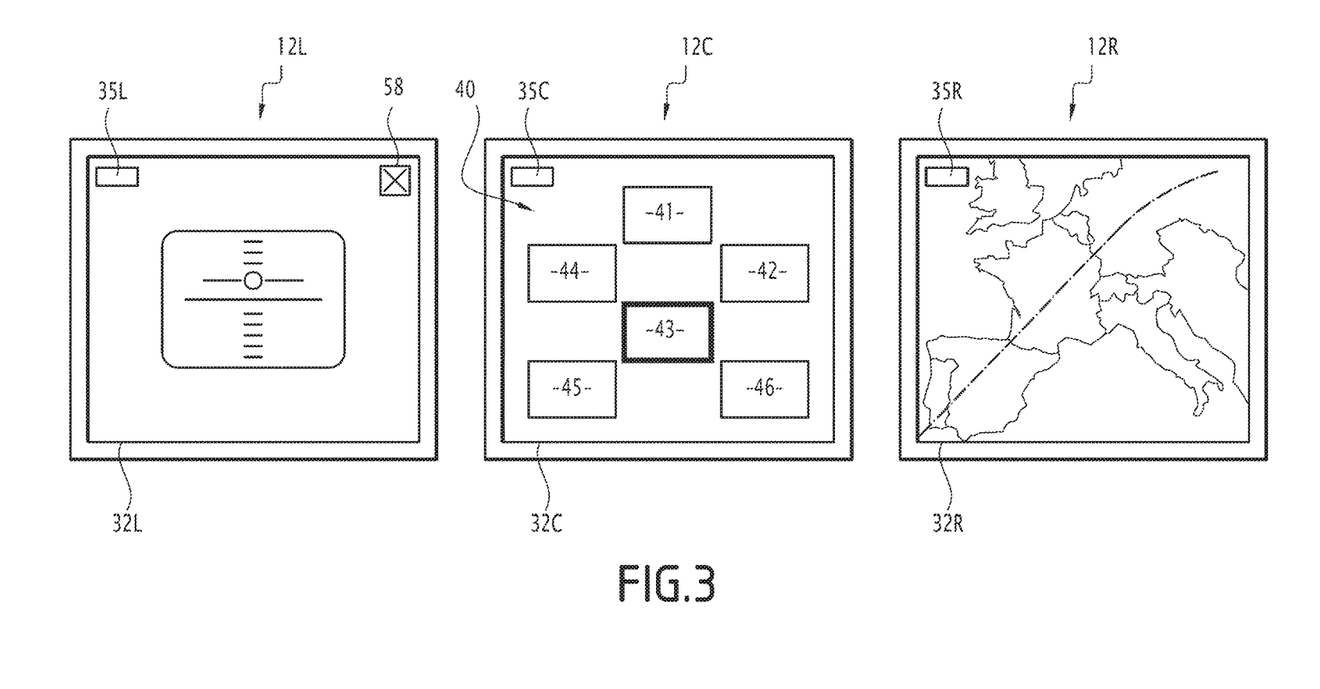
FIG. 3 is a schematic view of the display screens of FIG. 1.

The management module 21 is configured to define and manage a plurality of display spaces 32L, 32C, 32R visible in FIG. 3.

A display space refers to a predetermined part of the display surface of a display screen 12L, 12C, 12R making it possible to display information independently of the other display spaces, whether the latter belong to the same display screen or to other display screens.

Each display space 32L, 32C, 32R is determined by the management module 21, prior to the use of the display screens 12L, 12C, 12R.

Thus, for example, the display spaces 32L, 32C, 32R are determined by the management module 21 during a design phase of the cockpit 8 or of the aircraft, or during a maintenance phase of the aircraft.

Advantageously, the display spaces 32L, 32C, 32R are defined so as to substantially cover all of the display surfaces of the set of display screens 12L, 12C, 12R without having zones with superposition of at least two display spaces 32L, 32C, 32R. In other words, display spaces [correspond] to respective separate parts of said display surfaces, preferably to separate parts of said display surfaces.

In the example embodiment of FIG. 3, each of the display spaces 32L, 32C, 32R substantially completely covers the display surface of the display screen 12L, 12C, 12R, respectively.

Thus, according to this example embodiment, the management module 21 defines a single display space 32L, 32C, 32R for each display screen 12L, 12C, 12R.

The display spaces 32L, 32C, 32R are positioned in the cockpit 8 in predetermined positions that correspond, in the case of FIG. 3, to respective positions of the display screens 12L, 12C, 12R.

When the management module 21 defines at least two display spaces for a single display screen, the positions of these display spaces in the cockpit are determined by the position of this display screen in the cockpit and by the respective positions of these display spaces on the corresponding display screen.

The processing module 23 is connected to at least some of the on board systems of the aircraft.

The processing module 23 is configured to receive avionic data from these systems.

This avionic data for example comprises data relative to:
the situation of the aircraft relative to the air mass (angle of attack, sideslip, calibrated airspeed, etc.);
the orientation of the aircraft relative to the Earth's coordinate system (attitudes, heading, route, etc.);
the position of the aircraft in this same Earth's coordinate system (latitude, longitude, altitude, etc.);
the desired trajectory of the aircraft (flight plan described as a series of waypoints, altitude, speed constraints at these points, etc.);
the predictions regarding the situation of the aircraft at the different waypoints of the flight plan (arrival time, mass of the aircraft, remaining fuel, etc.);
the flight conditions in the aircraft's environment and its anticipated flight plan (wind, weather conditions, etc.);
the immediate environment of the aircraft (traffic, terrain, etc.);
the technical status of the various systems of the aircraft (propulsion, conditioning, electricity, hydraulic, etc.);
the action of the various automatic flight conduct systems of the aircraft (automatic pilot, envelope protection systems, etc.).

The processing module 23 is further configured to process this received avionic data to associate at least some of it with one or several elements to be displayed.

In particular, each element to be displayed is intended to be displayed for the pilot and for example has a diagram or a symbol allowing the pilot to perform at least one task chosen from among tasks for piloting the aircraft, tasks for monitoring the aircraft or tasks for managing on board systems in the aircraft.

Such an element to be displayed as for example a map incorporating the current position of the aircraft and optionally positions of other aircraft, or an altimeter or a horizon line, or a heading scale.

The processing module 23 is further configured to incorporate each element to be displayed in a display format chosen from among a set of predetermined display formats.

A display format refers to an image or a plurality of images grouped together in the form of one or several windows including several elements to be displayed integrated into this or these images according to predefined display rules.

In particular, for each display format, the display rules corresponding to this format define elements to be displayed intended to be incorporated into this format. These rules are for example defined as a function of the logical proximity of the tasks that these elements allow the pilot to perform.

Each display format is thus associated with an activity, each activity being characterized by a set of tasks performed by the pilot in sequence.

The logical proximity of several tasks is for example defined by the performance order of these tasks. Thus, for example, two tasks are considered to be logically close when they are designed to be performed one after the other or at the same time, or when one of these tasks is designed to be carried out after the performance of the other task in a time window of several seconds. The display rules further define the dimensions of each element to be displayed, its color, its absolute position in the format or relative position with respect to another element, a logic for changing its color, an interaction with another element, etc.

The display rules relative to each predetermined display format are for example stored in a database 33 provided to that end in the processing module 23.

Advantageously, the set of display formats consists of:
a piloting format including a plurality of elements to be displayed to allow the pilot either to pilot the aircraft manually on the desired trajectory, or to perform short-term monitoring of the automatic piloting of the aircraft;
a preparation format including a plurality of elements to be displayed to allow the pilot to prepare the future action plan;
a systems format including a plurality of elements to be displayed to allow the pilot to manage on board avionic or utility systems and to handle failures of these systems; and
a tactical format including a plurality of elements to be displayed to allow the pilot either to monitor the performance, by an avionic system, of a prepared action plan, or to alter this performance for a medium-term change.

"Short term" refers to a time interval of less than 1 minute, or even several (around 15) seconds.

"Medium term" refers to a time interval comprised between 30 seconds and 45 minutes. This in particular covers all of a descent plan from cruising to landing and tasks that are carried out therein.

"Action plan" refers to a set of actions that must be performed by the pilot in a predetermined time interval. Most of these actions are in particular defined from the flight plan.

The processing module 23 is configured to receive a message indicating an event.

Such a message is for example derived from a communication module outside the aircraft or any other on board system.

Each event is for example chosen from the group comprising:
- appearance of a failure of an avionic or auxiliary system;
- reception of a message from an air traffic control (ATC) center;
- reception of a message from an AOC (airline operations center);
- occurrence of an event scheduled in advance;
- need to carry out a particular procedure;
- passage by a particular waypoint;
- warning due to passage near a particular object.

The processing module 23 is configured to process each received message to associate the contents of this message with one of the display formats.

In particular, a received message is associated with one of the display formats when this display format makes it possible to perform the tasks related to the contents of this message.

Thus, for example, when a message corresponds to the appearance of a failure of an avionic system, the processing module 23 associates this message with the systems format making it possible to process on board systems management tasks. When it contains a request of the ATC type to go to a particular flight level, then the associated format is the piloting format by which the pilot can modify his setpoint altitude.

In the described example, the display module 25 is configured to select, for each display space 32L, 32C, 32R, a display format from among the set of display formats to display this selected display format on this display space 32L, 32C, 32R.

However, one skilled in the art will understand that the possibility of selecting a display format for each display space 32L, 32C, 32R is only one advantageous optional aspect of the invention.

The display module 25 is in particular configured to select, for each display space 32L, 32C, 32R, a display format after acquiring a display control command for example given by the pilot, as will be explained later.

The selection of a display format is thus made independently of the position, in the aircraft cockpit 8, of the display space 32L, 32C, 32R for which this format was selected.

Furthermore, the selection of a display format for a display space 32L, 32C, 32R on a given display screen 12L, 12C, 12R may be made independently of the operating state of the other display screens 12L, 12C, 12R.

In FIG. 3, the piloting format (diagrammed here by a horizon line and a pitch scale) is displayed on the display space 32L. The preparation format here in particular incorporating a map and an anticipated trajectory of the aircraft is displayed on the display space 32R.

The display module 25 is configured to display a display management page 40, described in more detail later.

The display module 25 is further configured to display at least one superposition zone 35L, 35C, 35R, superimposed on each display format, and in each superposition zone 35L, 35C, 35R, of information usable by the pilot independently of the display format being displayed, as will be explained hereinafter.

The position of each superposition zone 35L, 35C, 35R is predetermined for each of the display spaces 32L, 32C, 32R.

In the example of FIG. 3, the position of each superposition zone 35L, 35C, 35R is determined in the upper left corner of the corresponding display space 32L, 32C, 32R.

In this figure, a superposition zone 35L, 35C, 35R is defined for each display space 32L, 32C, 32R. However, according to another example embodiment, several superposition zones 35L, 35C, 35R displaying different messages are defined for a same display space 32L, 32C, 32R.

Each superposition zone 35L, 35C, 35R is associated with a display format and thus has a shortcut toward this display format.

In particular, the display module 25 is configured to associate each superposition zone 35L, 35C, 35R with a default display format. In this case, the information displayed on such a superposition zone 35L, 35C, 35R comprises elements or data derived from the format associated with this zone by default.

In the example of FIG. 3, each of the superposition zone 35L, 35C, 35R is associated with the default systems format.

When a message indicating an event has been received by the processing module 23, the display module 25 is configured to associate at least some of the superposition zones 35L, 35C, 35R with the display format associated with this message. In this case, the information displayed in these superposition zones 35L, 35C, 35R comprises this message.

When the last received message has been processed or has become obsolete, the display module 25 is configured to associate each superposition zone 35L, 35C, 35R with a default display format again.

The acquisition module 27 is configured to acquire display management commands in particular exercised by the pilot relative to one of the display spaces 32L, 32C, 32R.

The acquisition module 27 is configured to send each acquired display control command to modify the display on this or another display space 32L, 32C, 32R.

In particular, each display management command is chosen from the group comprising:
- a command to display the display management page;
- a command to select the display format;
- a first command to switch display formats;
- a second command to switch display formats;
- a selection command relative to a superposition zone;
- a first interaction command relative to a superposition zone;
- a second interaction command relative to a superposition zone; and
- a command to return to the previous display.

Among these commands, the display format selection command, the first command to switch display formats and the second command to switch display formats relate to the selection of a display format for different display spaces 32L, 32C, 32R and then represent only one advantageous optional aspect of the invention.

The command to display the display management page exercised relative to a display space 32L, 32C, 32R comprises a touch-sensitive sliding, preferably vertical, over this display space 32L, 32C, 32R. The touch-sensitive sliding for example comprises sweeping with several fingers, in particular three or four fingers, the fingers preferably being alongside one another.

This command makes it possible to show the display management page 40 on the corresponding display space 32L, 32C, 32R.

Upon acquiring this command, the display module 25 is then configured to display the display management page 40, which is illustrated in detail in FIG. 3.

In particular, in this FIG. 3, the display management page 40 is displayed on the display space 32C and includes four display format symbols 41 to 44 respectively corresponding to the piloting format, the tactical format, the systems format and the preparation format.

Furthermore, one of these display format symbols 41 to 44 includes a distinctive sign indicating that the display format corresponding to this symbol was displayed on the corresponding display space 32C, before the display of the display management page 40.

This distinctive sign for example comprises a frame with a particular color and/or a particular thickness surrounding the corresponding display format symbol.

Thus, in the example of FIG. 3, the symbol 43 is surrounded by a thick box, which means that on the display space 32C, the systems format was displayed before displaying the display management page 40.

The display management page 40 further includes two switching symbols 45, 46.

The switching symbol 45 is displayed in the left part of the display management page 40 and corresponds to the display space 32L.

The switching symbol 46 is displayed in the right part of the display management page 40 and corresponds to the display space 32R.

The meaning of these symbols will be explained later.

The display format selection command relative to a display space 32L, 32C, 32R (32C in FIG. 3) is in particular exercised by the pilot after the command to display the display management page. This command makes it possible to display it on the corresponding display space 32L, 32C, 32R (32C in FIG. 3).

In particular, the display format selection command comprises the selection, for example touch-sensitive, such as a short tap, of one of the display format symbols 41 to 44 on the display management page 40.

Upon acquiring such a selection command, the display module 25 is then configured to select, for the corresponding display space 32L, 32C, 32R (32C in FIG. 3), the display format corresponding to the selected display format symbol, potentially independently of what is displayed on the other display spaces 32L, 32C, 32R in the cockpit (32L and 32R in the described example).

The first or second command to switch display formats is in particular exercised by the pilot on one of the display spaces 32L, 32C, 32R to switch the display format displayed on this display space 32L, 32C, 32R with one of the display formats displayed on another display space 32L, 32C, 32R.

Thus, for example, the first display format switching command comprises a touch-sensitive sliding exerted on one of the display spaces 32L, 32C, 32R, called first display space, toward another display space 32L, 32C, 32R, called second display space. The touch-sensitive sliding for example comprises sweeping with several fingers, in particular three or four fingers, the fingers preferably being alongside one another.

In the event such a command is acquired, the display module 25 is then configured to select the display format displayed on the second display space for the first display space, and conversely, to select the display format displayed on the first display space for the second display space.

Thus, in the example of FIG. 3, when a sweeping action toward the right is exerted on the display space 32L, the display formats are switched between the display spaces 32L and 32C.

When a sweeping action toward the left is exerted on the display space 32R, the display formats are switched between the display spaces 32L and 32R.

When a sweeping action toward the right or toward the left is exerted on the display space 32C, the display formats are switched between the display spaces 32R and 32C, or the display spaces 32L and 32C, respectively.

The second display format switching command comprises selecting one of the switching symbols 45, 46 on the display management page 40.

In particular, upon acquiring the display format switching command exercised by the selection of the symbol 45, the display module 25 switches the display formats between the display spaces 32L and 32C.

Upon acquiring the second display format switching command exercised by the selection of the symbol 46, the display module 25 switches the display formats between the display spaces 32R and 32C.

The selection command relative to a superposition zone 35L, 35C, 35R comprises the selection, for example touch-sensitive, of this superposition zone 35L, 35C, 35R on the corresponding display space 32L, 32C, 32R.

Upon acquiring such a command, the display module 25 is configured to select, for the display space 32L, 32C, 32R on which the command was exercised, the display format associated with this superposition zone 35L, 35C, 35R.

The first interaction command relative to a superposition zone 35L, 35C, 35R comprises the activation of this superposition zone 35L, 35C, 35R on the corresponding display space 32L, 32C, 32R. The activation in particular comprises a touch-sensitive pressure, then touch-sensitive sliding without releasing this superposition zone 35L, 35C, 35R.

Upon acquiring such a command, the display module 25 is configured to indicate to the pilot, on the display space 32L, 32C, 32R on which the command was exercised, the display format associated with this superposition zone 35L, 35C, 35R.

In particular, such an indication comprises the superimposed display of the symbol 41 to 44 corresponding to the display format associated with this superposition zone 35L, 35C, 35R.

Figure 4:
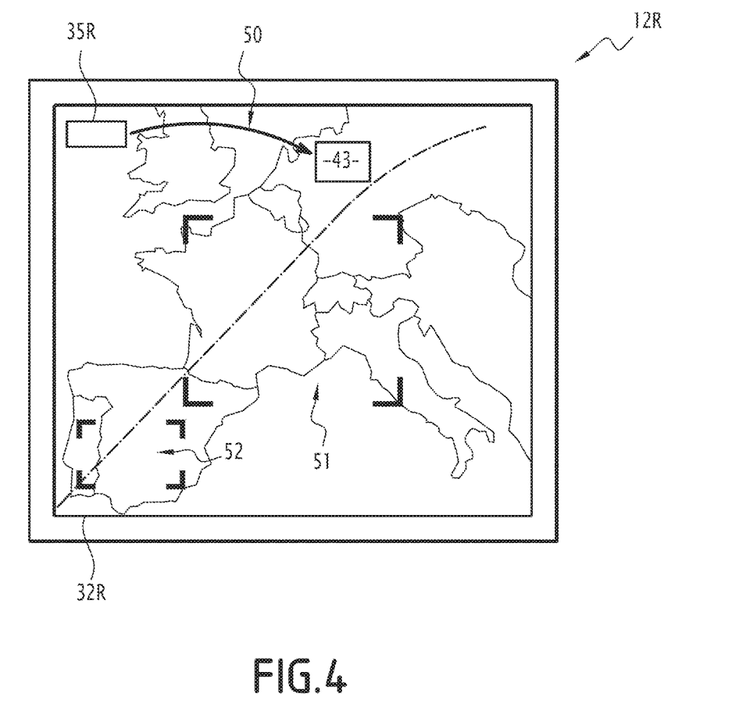
FIG. 4 is another schematic view of one of the display screens of FIG. 1.

The execution of a first interaction command on the display space 12R is illustrated in FIG. 4.

In this figure, the superposition zone 35R of a message associated with the systems format is slid, without releasing, along the line 50. The display module 25 then displays the display format symbol 43 corresponding to the systems format, superimposed on the display format displayed on the display space 32R. This display symbol 43 is superimposed all throughout the sliding.

The second interaction command relative to a superposition zone 35L, 35C, 35R comprises a movement of this superposition zone 35L, 35C, 35R on the corresponding display space 32L, 32C, 32R toward a target zone.

Each target zone corresponds to one of the display spaces 35L, 35C, 35R.

The movement of the corresponding superposition zone 35L, 35C, 35R in particular comprises a touch-sensitive sliding, without release of this zone, toward a target zone, dropping this superimposed zone 35L, 35C, 35R in the target zone.

Upon acquiring such a command, the display module 25 is configured to select, for the display space 32L, 32C, 32R corresponding to the target zone, the display format associated with the moved superposition zone 35L, 35C, 35R.

Thus, in the example illustrated in FIG. 4, the display space includes two target zones 51, 52.

The target zone 51 is positioned at the center of the display space 32R and corresponds to this display space 32R. The target zone 52 is positioned in the left part of the display space 32R and corresponds to the display space 32C.

The target zones 51, 52 are for example displayed by the display module 25 superimposed on the display format 35L, 35C, 35R when sliding of the superposition zone 35L, 35C, 35R is detected.

In the example of FIG. 4, when the superposition zone 35R is dropped in the target zone 51, the display module 25 selects, for the display space 32R, the display format associated with this message, i.e., the systems format.

When the superposition zone 35R is dropped in the target zone 53, the display module 25 selects, for the display space 32C, the display format associated with this message, i.e., the systems format.

Lastly, the command to return to the previous display makes it possible to return to the display of the display format viewed before carrying out any of the commands relative to a superposition zone on the corresponding display space 32L, 32C, 32R.

In particular, this command is executable when the current display format has been selected following the execution of a selection command relative to a superposition zone or a second interaction command relative to a superposition zone.

The command to return to the previous display comprises activating an appropriate symbol displayed for example in a top right corner superimposed on the corresponding display format. This symbol for example comprises a cross 58 displayed on the display space 32L and visible in FIG. 3.

Upon acquiring such a command to return to the previous display, the display module 25 is configured to select, for the display space 32L, 32C, 32R corresponding to the display format previously displayed on this display space 32L, 32C, 32R.

Figure 5:
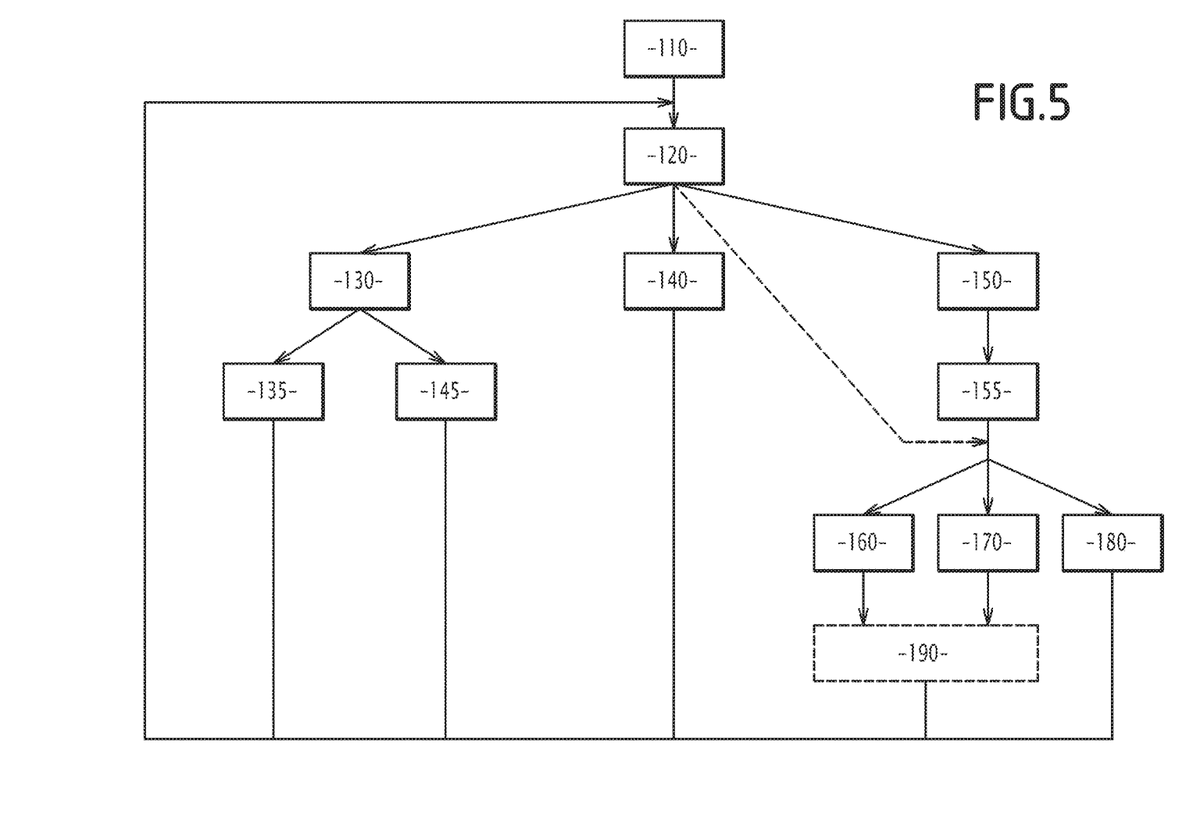
FIG. 5 is a flowchart of a display method according to the invention.

A method for displaying avionic data carried out by the display system 14 will now be explained in reference to FIG. 5, showing a flow chart of its steps.

During the initial design step 110 of the cockpit 8 or the aircraft, or in preparation for a maintenance operation, the designer of the management module 21 defines a plurality of display spaces 32L, 32C, 32R for the display screens 12L, 12C, 12R.

During this same step, the designer of the display module 25 selects, by each of the display spaces 32L, 32C, 32R, one of the display formats predetermined by default, which characterizes the configuration of the cockpit upon startup. This selection for example corresponds to the typical organization of the information in the cockpit. It may also select an optimal organization to support all of the tasks that the pilots will perform on the ground before actually being able to leave the parking area.

During this same step, the designer of the display module 25 defines superposition zones 35L, 35C, 35R for each display space 32L, 32C, 32R and associates a default display format with each of these superposition zones 35L, 35C, 35R.

The following steps of the method are carried out cyclically when the operation of the display system 14 is activated. In particular, the operation of the display system 14 is activated when the aircraft is used.

During step 120, the processing module 23 receives, in real time, avionic data from different avionic systems.

During the same step 120, the processing module 23 processes this received avionic data and associates at least some of it with one or several elements to be displayed.

Thus, for example, when the received data comprises the current attitudes (pitch and roll) of the aircraft, the processing module 23 associates these attitudes with the horizon line.

Then, the processing module 23 incorporates each element to be displayed with the avionic data associated with this element into one of the predetermined display formats.

If the display format is currently displayed on one of the display spaces 32L, 32C, 32R, the display of this format is updated and the new avionic data incorporated into this format then immediately become(s) visible on the corresponding display space 32L, 32C, 32R.

In particular, according to the preceding example, during this step 120, the horizon line corresponding to the attitudes of the aircraft is incorporated by the processing module 23 into the piloting format that is then currently displayed on the display space 32L.

According to one advantageous optional aspect of the invention, when the pilot wishes to select a display format for one of the display spaces 32L, 32C, 32R, he first performs, during step 130, a display command of the display management page 40 on the display space 32L, 32C, 32R.

The acquisition module 27 receives such a command and send it to the display module 25, which then displays, on the corresponding display space 32L, 32C, 32R, the display management page 40.

Then, during the following step 135, the pilot performs a display format selection command by selecting one of the display format symbols 41 to 44 on the display management page 40.

If the pilot wishes to return to the display format previously displayed on the display space 32L, 32C, 32R, he then selects the display format symbol 41 including the distinctive sign.

The acquisition module 27 receives such a command and sends it to the display module 25, which then displays, on the corresponding display space 32L, 32C, 32R, the display format associated with the selected display format symbol 41 to 44.

When the pilot wishes to switch the display formats currently displayed on two different display spaces 32L, 32C, 32R, he then performs, during step 140, a first display format switching command.

In particular, this command is performed by carrying out a sweeping action, for example with three or four fingers, the fingers preferably being alongside one another, on one of said two display spaces 32L, 32C, 32R toward the other display space 32L, 32C, 32R.

The acquisition module 27 receives such a command and sends it to the display module 25, which then displays, on one of said two display spaces 32L, 32C, 32R, the display format previously displayed on the other display space 32L, 32C, 32R and vice versa.

Alternatively, to switch the display formats currently displayed on two different display spaces 32L, 32C, 32R, the pilot first performs a display command of the display management page 40 on one of said two display spaces 32L, 32C, 32R. Step 130 previously described is then carried out.

Then, during the following step 145, the pilot performs a second display format switching command by selecting the switching symbol 45, 46 corresponding to the other display space 32L, 32C, 32R, on the display management page 40.

The acquisition module 27 receives such a command and sends it to the display module 25, which then displays, on one of said two display spaces 32L, 32C, 32R, the display format previously displayed on the other display space 32L, 32C, 32R and vice versa.

When, during step 150, an event as previously defined has occurred, the processing module 23 receives a message indicating that event.

Then, the processing module 23 associates this message with one of the predetermined display formats.

Then, during step 155, the display module 25 displays this received message on each of the display spaces 32L, 32C, 32R superimposed on each display format displayed on the corresponding display space 32L, 32C, 32R.

This message is then displayed in the corresponding superposition zones 35L, 35C, 35R.

When the pilot wishes to display the display format corresponding to the received message, he then, during step 160, performs a selection command relative to one of the superposition zones 35L, 35C, 35R displaying this message.

The acquisition module 27 receives such a command and sends it to the display module 25, which then displays, on the display space 32L, 32C, 32R corresponding to the selected superposition zone 35L, 35C, 35R, the display format associated with this superposition zone 35L, 35C, 35R.

Alternatively, to display the display format corresponding to the received message, the pilot, during step 170, performs a second interaction command relative to one of the superposition zones 35L, 35C, 35R displaying this received message by moving this superposition zone 35L, 35C, 35R toward a target zone 51, 52.

The acquisition module 27 receives such a command and sends it to the display module 25, which then displays, on the display space 32L, 32C, 32R corresponding to the target zone 51, 52 in which the superposition zone 35L, 35C, 35R has been moved, the display format associated with the message.

When the pilot simply wishes to know the display format associated with the message, during step 180, he performs a first interaction command relative to one of the superposition zones 35L, 35C, 35R displaying this message by performing a touch-sensitive sliding of this superposition zone 32L, 32C, 32R along the trajectory 50.

The acquisition module 27 receives such a command and sends it to the display module 25, which then displays, on the display space 32L, 32C, 32R corresponding to the moved superposition zone 32L, 32C, 32R, the display format symbol 43 corresponding to the display format associated with the received message. This symbol is displayed superimposed.

When the pilot wishes to return to the display of the display format previously displayed on one of the display spaces 32L, 32C, 32R before performing a selection command relative to one of the superposition zones 35L, 35C, 35R displaying the received message or a second interaction command relative to this superposition zone, during step 190, he performs a command to return to the previous display.

In particular, this command is carried out by selecting the cross 58 on the corresponding display space 32L, 32C, 32R.

The acquisition module 27 receives such a command and sends it to the display module 25, which then displays, on the corresponding display space 32L, 32C, 32R, the previous display format.

According to another example embodiment of the method, steps 160, 170 and 180 are carried out without steps 150 and 155 being carried out, i.e., when no message has been received by the processing module 23 or when the last received message has been processed or has become obsolete.

In this case, performing a selection command relative to a superposition zone 35L, 35C, 35R during step 160 leads to displaying the display format associated with this superposition zone 35L, 35C, 35R by default.

Performing a second interaction command relative to a superposition zone 35L, 35C, 35R during step 170 leads to displaying the display format associated with this superposition zone 35L, 35C, 35R by default.

Performing a first interaction command relative to a superposition zone 35L, 35C, 35R during step 180 leads to indicating the display format associated with this superposition zone 35L, 35C, 35R by default.

Moreover, one skilled in the art will understand that steps 130, 135, 140 and 145 relate to the selection of a display format for different display spaces 32L, 32C, 32R. Thus, these steps are carried out optionally and are merely one advantageous optional aspect of the invention.

One can then see that the invention has a certain number of advantages.

Indeed, the display system according to the invention makes it possible to select, for each display space, a display format independently of the physical position of this display space in the cockpit of the aircraft, each display format being chosen from a set of predetermined display formats.

The display system is thus particularly useful in case of failure of one or several screens of the cockpit. Indeed, in such a case, the pilot or any other operator can select the display format for each of the operating screens.

This then avoids the need to reorganize the display of the information in the cockpit in case of failure.

Each display format is familiar to the pilot and does not change when a failure occurs. Thus, no specific learning by pilots for different failure cases is needed.

Lastly, the display system according to the invention has an intuitive man-machine interface that is easy to manipulate.

The invention claimed is:

1. A system for displaying avionic data on at least one display space of an aircraft cockpit of an aircraft, the at least one display space being configured to display the avionic data using a display format chosen from among a set of predetermined display formats, the system comprising:
    a processing module configured to receive a message to be displayed indicating an event and to associate a content of this message with one of the set of predetermined display formats;
    a display module configured to display the received message superimposed on a current content displayed in at least one current display format, displayed on a respective display space of the aircraft cockpit; and
    an acquisition module, configured to acquire a display control command related to the received message;
    the display module further being configured to display a display format associated with the content of the received message on the at least one display space in case of acquisition of the display control command related to the received message,
    wherein each of the set of the predetermined display formats is associated with an activity, and each activity includes a set of tasks performed in sequence by a pilot, and
    wherein the set of predetermined display formats comprises: a piloting format dedicated to piloting the aircraft and managing a trajectory of the aircraft in a short term, a preparation format dedicated to preparing an action plan, a tactical format dedicated to carrying out a prepared action plan and a systems format dedicated to an operation of one or several avionic systems.

2. The system according to claim 1, wherein:
the acquisition module is further configured to acquire a first interaction command related to the displayed received message; and
the display module is further configured to indicate the display format associated with the content of the displayed received message as a function of the first acquired interaction command.

3. The system according to claim 1, wherein the received message is displayed superimposed on the current content displayed in the current display format in a predetermined superposition zone of the respective display space.

4. The system according to claim 3, wherein the display control command related to the received message comprises a movement of the predetermined superposition zone toward a center of the respective display space.

5. The system according to claim 3, further configured to display the avionic data on a plurality of display spaces of the aircraft cockpit;
wherein the display control command related to the received message comprises a movement over a display space of the predetermined superposition zone toward a target zone chosen from among a set of predetermined target zones and associated with one of the plurality of display spaces;
the display module then being configured to display the received message in the display format on the display space of the predetermined superposition zone.

6. The system according to claim 1, wherein:
the acquisition module is further configured to acquire a command to return to a previous display related to the display format currently displayed following the acquisition of a corresponding display control command; and
the display module is further configured to display a display format preceding the current display format in case of acquisition of the return command related to said current display format.

7. An aircraft cockpit including at least one display space and a system for displaying avionic data on the display space;
wherein the display system is according to claim 1.

8. A method for displaying avionic data on at least one display space of an aircraft cockpit, the at least one display space being able to display the avionic data using a display format chosen from among a set of predetermined display formats, the method comprising:
receiving a message to be displayed indicating an event and associating a content of this message with one of the set of predetermined display formats;
displaying the received message superimposed on a current content displayed in at least one current display format, displayed on a respective display space of the aircraft cockpit;
acquiring a display control command related to the received message; and
displaying a display format associated with the received message on the at least one display space in case of acquisition of the display control command related to the received message,
wherein each of the set of predetermined display formats is associated with an activity, and each activity includes a set of tasks performed in sequence by a pilot, and
wherein the set of predetermined display formats comprises: a piloting format dedicated to piloting the aircraft and managing a trajectory of the aircraft in a short term, a preparation format dedicated to preparing an action plan, a tactical format dedicated to carrying out a prepared action plan and a systems format dedicated to an operation of one or several avionic systems.

9. A non-transitory computer readable medium, having instructions stored thereon that, when executed by a processor, cause the processor to implement the method according to claim 8.

* * * * *